United States Patent
Matsuo

(10) Patent No.: US 11,816,377 B1
(45) Date of Patent: Nov. 14, 2023

(54) INDUSTRIAL PRINTING SYSTEM, PRINT SERVER, AND PROCESS MANAGEMENT METHOD FOR PEER-TO-PEER DISTRIBUTED PROCESSING ACCORDING TO PAPER SETTINGS AND IMPOSITION SETTINGS FOR PRODUCTION PRINTING

(71) Applicant: KYOCERA Document Solutions Inc., Osaka (JP)

(72) Inventor: Taku Matsuo, Los Angeles, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/982,357

(22) Filed: Nov. 7, 2022

(51) Int. Cl.
*G06F 3/12* (2006.01)

(52) U.S. Cl.
CPC .......... *G06F 3/1264* (2013.01); *G06F 3/1203* (2013.01); *G06F 3/1226* (2013.01); *G06F 3/1241* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 2009/0279137 A1* | 11/2009 | Mori | G06F 3/1212 358/1.15 |
| 2010/0171982 A1* | 7/2010 | Sato | G06F 3/1203 358/1.15 |
| 2014/0211256 A1* | 7/2014 | Hosotsubo | H04N 1/00042 358/1.15 |
| 2015/0156351 A1 | 6/2015 | Yamamoto | |

FOREIGN PATENT DOCUMENTS

JP 2015-107555 A 6/2015

* cited by examiner

*Primary Examiner* — Lennin R Rodriguezgonzalez
(74) *Attorney, Agent, or Firm* — Hawaii Patent Services; Nathaniel K. Fedde; Kenton N. Fedde

(57) ABSTRACT

Provided is an industrial printing system that performs peer-to-peer distributed processing according to paper settings and imposition settings for production printing. A plurality of print servers performs distributed processing of a job. Each print server includes a storage unit, a job changing unit, and a processing management unit. The storage unit stores resource information related to paper setting and imposition setting of the plurality of print servers. The job changing unit changes the job suitable to other print server selected from the plurality of print servers based on the resource information stored in the storage unit. The processing management unit transmits the job changed by the job changing unit to the other print server and requests processing.

15 Claims, 7 Drawing Sheets

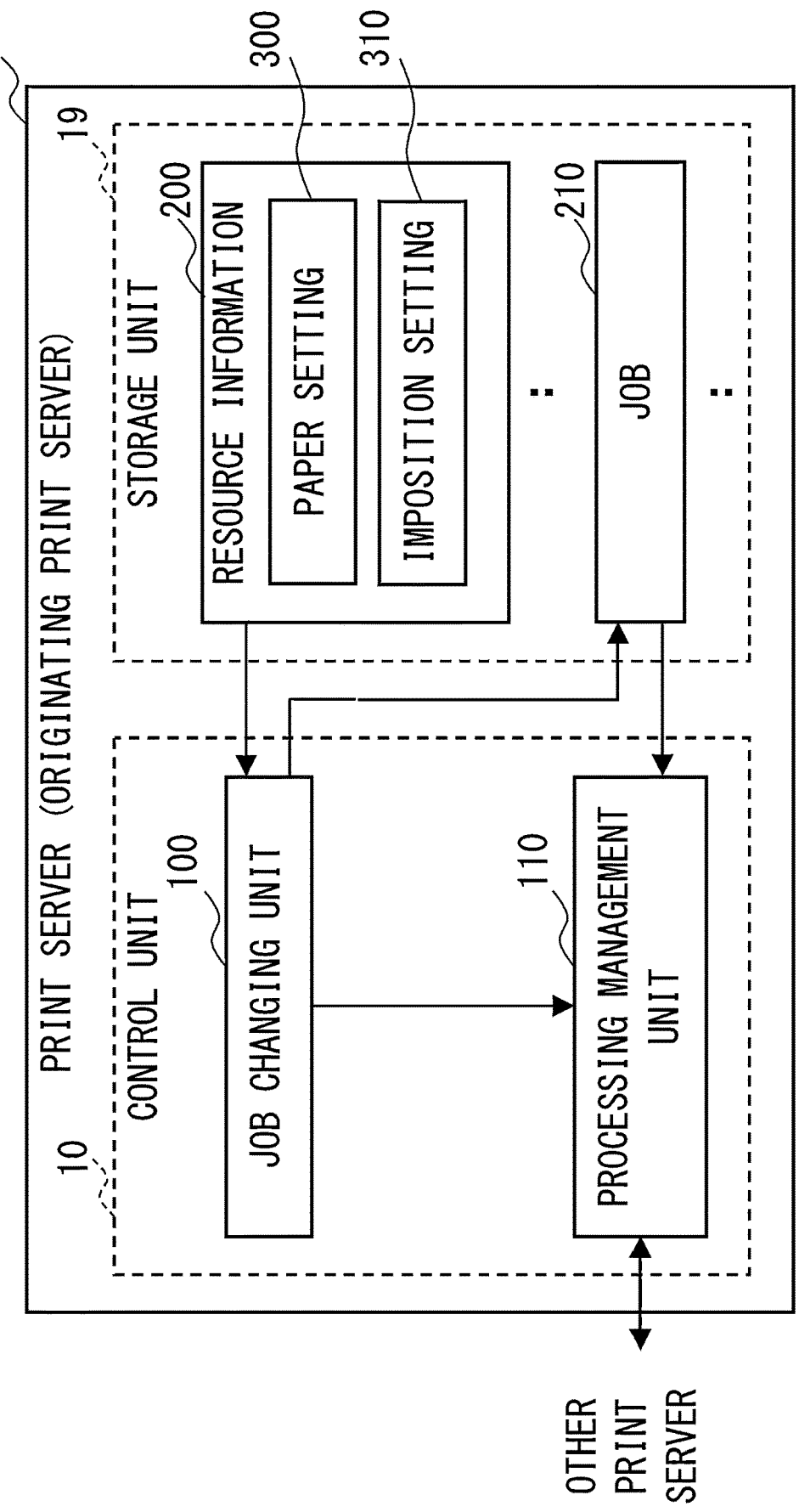

FIG. 4

Mondi NAUTILUS Triotec ReFresh

| Paper name | Type | Pre-cut tabs | Set count | Color | Coating (front/back) | Texture | Hole pattern | Recycled % | Preprinted |
|---|---|---|---|---|---|---|---|---|---|
| ▪ Pre-cut:White | Pre-cut tabs | | 1 | ● White | Unspecified/Unspecified | Smooth | None | 25% | No |
| 90 gsm — 157 μm | | A3 ⓘ  A3R ⓘ  A4R ⓘ  A3 (Long) ⓘ  A6 ⓘ  A6R ⓘ  A4 (Short) ⓘ  A4R ⓘ  A4R (Short) ⓘ  A5 (Short) ⓘ  A5 ⓘ | | | | | | | |
| 100 gsm — 183μm | | A4 (Short) ⓘ  A4 (Long) ⓘ  A3 ⓘ  A3R ⓘ | | | | | | | |
| 120 gsm — 198 μm | | A4 ⓘ  A4 (Long) ⓘ  A3 ⓘ  A3R ⓘ | | | | | | | |
| 165 gsm — 241 μm | | A4 ⓘ  A4R ⓘ  A3 ⓘ  A3R ⓘ | | | | | | | |
| ▪ Plain:Goldenred | Plain | | 1 | ● Goldenrod | Unspecified/Unspecified | Smooth | None | 25% | No |
| 90 gsm — 157 μm | | A4 ⓘ  A4 (Long) ⓘ  A3 ⓘ  A3R ⓘ | | | | | | | |
| 100 gsm — 183μm | | A4 ⓘ  A4R ⓘ  A3 ⓘ  A3R ⓘ | | | | | | | |
| 120 gsm — 198 μm | | A4 ⓘ  A4R ⓘ  A4 (Long) ⓘ  A4R (Short) ⓘ | | | | | | | |
| 165 gsm — 241 μm | | A4 ⓘ  A4R ⓘ  A3 ⓘ  A3R ⓘ | | | | | | | |

300

INDUSTRIAL PRINTING SYSTEM, PRINT SERVER, AND PROCESS MANAGEMENT METHOD FOR PEER-TO-PEER DISTRIBUTED PROCESSING ACCORDING TO PAPER SETTINGS AND IMPOSITION SETTINGS FOR PRODUCTION PRINTING

BACKGROUND

The present disclosure relates to industrial printing systems, print servers, and process management methods with distributed processing, particularly for industrial printing (production printing).

Among print systems that typically include a plurality of printers, there are print systems that perform so-called ubiquitous printing. In this system, when a print system including a plurality of printers (MFPs) receives a ubiquitous job from a PC that issued the job, the first MFP stores the print settings in memory if the print settings can be processed by its own print function, and if it cannot be processed, it is transferred to the next MFP. This processing is performed according to the predetermined order from the first MFP to the Nth MFP. This saves the ubiquitous job in the memory of the MFP that can process it. As a result, in the printing system, it is possible to reduce the waiting time until the user obtains the printed matter.

That is, in this typical technique, print data (job) is transferred to each MFP, and it is determined whether or not the transferred MFP itself can process the data.

On the other hand, in industrial printing called production printing by using a commercial (industrial) printing apparatus, the component members of the final product are produced by dividing the work into a plurality of processes. For example, in the case of bookbinding, a cover, a body (color), a body (black and white), a promotional item, a band, a shipping envelope, or the like, are processed as different jobs. Then, in the middle of the process, each job is combined and finished as a book as the final product.

SUMMARY

An industrial printing system of the present disclosure is an industrial printing system for production printing having a plurality of print servers for distributed processing of a job, and each of the plurality of print servers including: a storage unit that stores resource information related to paper setting and imposition setting of the plurality of print servers; a job changing unit that changes the job suitable to other print server selected from the plurality of print servers based on the resource information stored in the storage unit; and a processing management unit that transmits the job changed by the job changing unit to the other print server to request processing.

A print server of the present disclosure is a print server that performs distributed processing of jobs in an industrial printing system for production printing, including: a storage unit that stores resource information related to paper setting and imposition setting of the plurality of print servers; a job changing unit that changes the job suitable to other print server selected from the plurality of print servers based on the resource information stored in the storage unit; and a processing management unit that transmits the job changed by the job changing unit to the other print server to request processing.

A process management method of the present disclosure is a process management method performed by an industrial printing system for production printing having a plurality of print servers for distributed processing of jobs, including the steps of: storing resource information related to paper setting and imposition setting of the plurality of print servers; changing the job suitable to other print server selected from the plurality of print servers based on the resource information that is stored; and transmitting the job that is changed to the other print server to request processing.

BRIEF DESCRIPTION OF THE DRAWINGS

FIG. 3 is a block diagram showing the functional configuration of the print server as shown in FIG. 1;

FIG. 4 is a conceptual diagram of the paper settings as shown in FIG. 3;

DETAILED DESCRIPTION

Embodiment

[Configuration of Industrial Printing System X]

Figure 1:
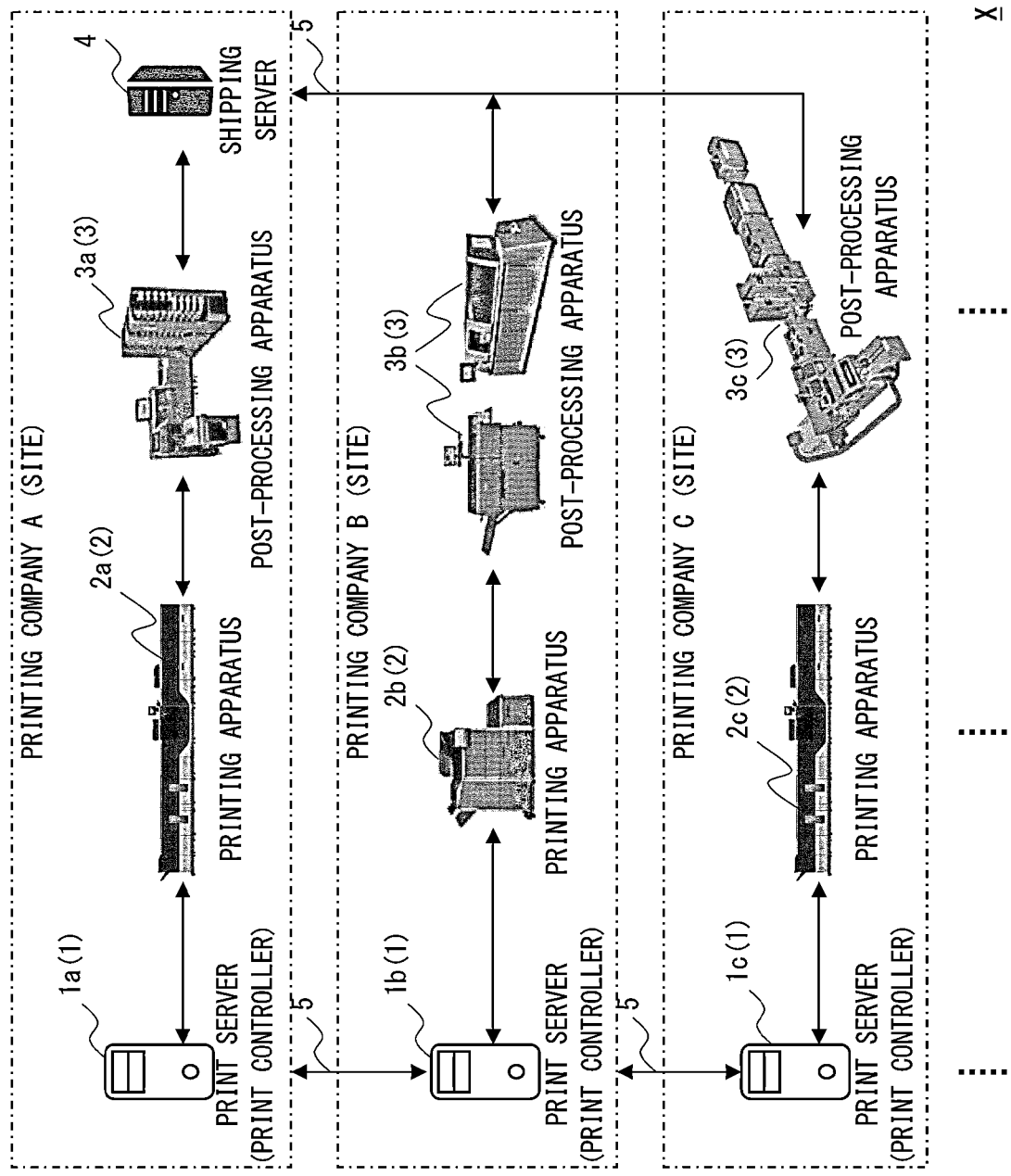
FIG. 1 is an example of a system configuration diagram of an industrial printing system according to an embodiment of the present disclosure.

Firstly, with reference to FIG. 1, an example of the overall system configuration of the industrial printing system X according to the present embodiment is described.

The industrial printing system X according to the present embodiment is a system that executes output in a printing step and a post-processing step (hereinafter also simply referred to as "printing") in industrial printing (production printing).

Here, in the industrial printing system X according to the present embodiment, a final product such as a book to be output is defined as an "order," and each component of the order is defined as a job 210 (FIG. 3).

In the industrial printing system X, sites such as printing companies, printing factories, or the like, are connected by a network 5 and cooperated. Each site includes a print server 1 and component apparatus(es). In the present embodiment, the component apparatus is a printing-related apparatus and, for example, includes a printing apparatus 2, a post-processing apparatus 3, the shipping server 4, and the like.

In FIG. 1, as an example of the inter-site cooperation, each of print servers 1a, 1b, 1c, . . . in the printing companies A, B, C, . . . and a shipping server 4 in the printing company A are connected via a network 5.

Hereinafter, any one of these print servers 1a, 1b, 1c . . . is simply referred to as print server 1.

The print server 1 is an information processing apparatus that serves as a print controller, which manages and controls the component apparatuses at each site. In the present embodiment, the print server 1 manages and controls the printing apparatus 2, the post-processing apparatus 3, and the shipping server 4 provided at each site. The print server 1 is configured as a PC (Personal Computer) server, a dedicated apparatus, a general-purpose apparatus, or the like.

In the present embodiment, the print server 1 performs peer-to-peer distributed processing of the job 210 for production printing by executing dedicated print management application software (hereinafter simply referred to as "application"). This print management application (hereinafter referred to as a "dedicated application") may be run on a common platform that performs print design creation, user management, tenant management, security management, maintenance notification service, prepress processing management, storage management of each document, and management of the printing apparatus 2, or the like.

Specifically, in the production printing, the print server 1 transmits and receives various instructions and information to and from the printing apparatus 2, the post-processing apparatus 3, the shipping server 4, and the like. As a result, the print server 1 manages the status of each apparatus and requests the processing of the job 210 (FIG. 3).

In the present embodiment, the print servers 1 become a print server 1, which is the request side (hereinafter referred to as the "originating print server"), or a print server 1, which is the side to which the distributed processing is requested (hereinafter referred to as the "other print server"). That is, the originating print server is the request source of the distributed processing, and the other print server is the request destination of the distributed processing. Then, the originating print server requests the other print server (the distribution destination) to process at least a part of the job 210. At this time, the job 210 itself can be changed so that the printing apparatus 2 connected to the other print server can print on the paper specified in the job 210.

The printing apparatus 2 is an automated printing apparatus that performs the processing of the printing step, which is an industrial printer including an image forming apparatus for printing in small lots, an offset printing apparatus for printing in large quantities (multiple lots), and the like.

In the present embodiment, the printing apparatus 2 at each site may differ in size, quality, color profile, recordable range, or the like, for recording paper used in the printing process.

FIG. 1 shows an example in which printing companies A, B, C, . . . are provided with respective printing apparatuses 2a, 2b, 2c, . . . .

Hereinafter, any one of these printing apparatuses 2a, 2b, 2c, . . . is simply referred to as the printing apparatus 2.

The post-processing apparatus 3 is various kinds of apparatuses for executing post-processing step such as folding, collating, cutting, bookbinding, or the like, for recording papers printed by the printing apparatus 2.

In the present embodiment, the post-processing apparatus 3 at each site may also differ in the contents, range, and the like of processes that can be executed in the post-processing step.

FIG. 1 shows an example in which printing companies A, B, C, . . . are provided with respective post-processing apparatuses 3a, 3b, 3c, . . . .

Hereinafter, any one of the post-processing apparatuses 3a, 3b, 3c, is also simply referred to as the post-processing apparatus 3.

The shipping server 4 is a server that manages the shipping of the order sent from each site after the printing process and/or post-processing process is completed.

In the present embodiment, an example by using the shipping server 4 at the site of company A is described, but the shipping server 4 may be provided at other sites as well.

The network 5 is a LAN (Local Area Network), a wireless LAN (Wi-Fi), a WAN (Wide Area Network), a mobile telephone network, an industrial network, a voice telephone network, other dedicated lines, or the like. The network 5 can transmit and receive various commands and data to and from each apparatus. Furthermore, the print server 1 and each component apparatus may also be connected via a LAN, or the like, of the network 5. In addition, the network 5 may be configured with a VPN (Virtual Private Network), or the like.

In addition, a plurality of these apparatuses may exist according to the application, the scale of printing, and the like. Each apparatus can be connected to the print server 1 by various protocols via the network 5, LAN, or the like. Alternatively, the print server 1 and each apparatus may be directly connected by wire using various interfaces.

In addition, each site may have other component apparatuses managed by the print server 1. The other component apparatuses include, for example, a terminal for manuscript submission, a terminal for design proofreading, a prepress apparatus, and the like.

In addition, administrator terminal used by a user such as an administrators of the print server 1, or the like, or a general terminal such as a PC, smart phone, a console, or the like (Hereinafter, simply called as "administrator terminal or console"), may be connected via the network 5 from inside and outside each site. As a result, each print server 1 can be accessed by a user by using a web browser, a terminal software, a dedicated application, or the like, on the administrator terminal or console, or the like, and it is possible to perform acquiring job 210, printing design, submitting a manuscript, managing prepress processing, checking progress, requesting processing, and the like.

[Control Configuration of Print Server 1]

Figure 2:
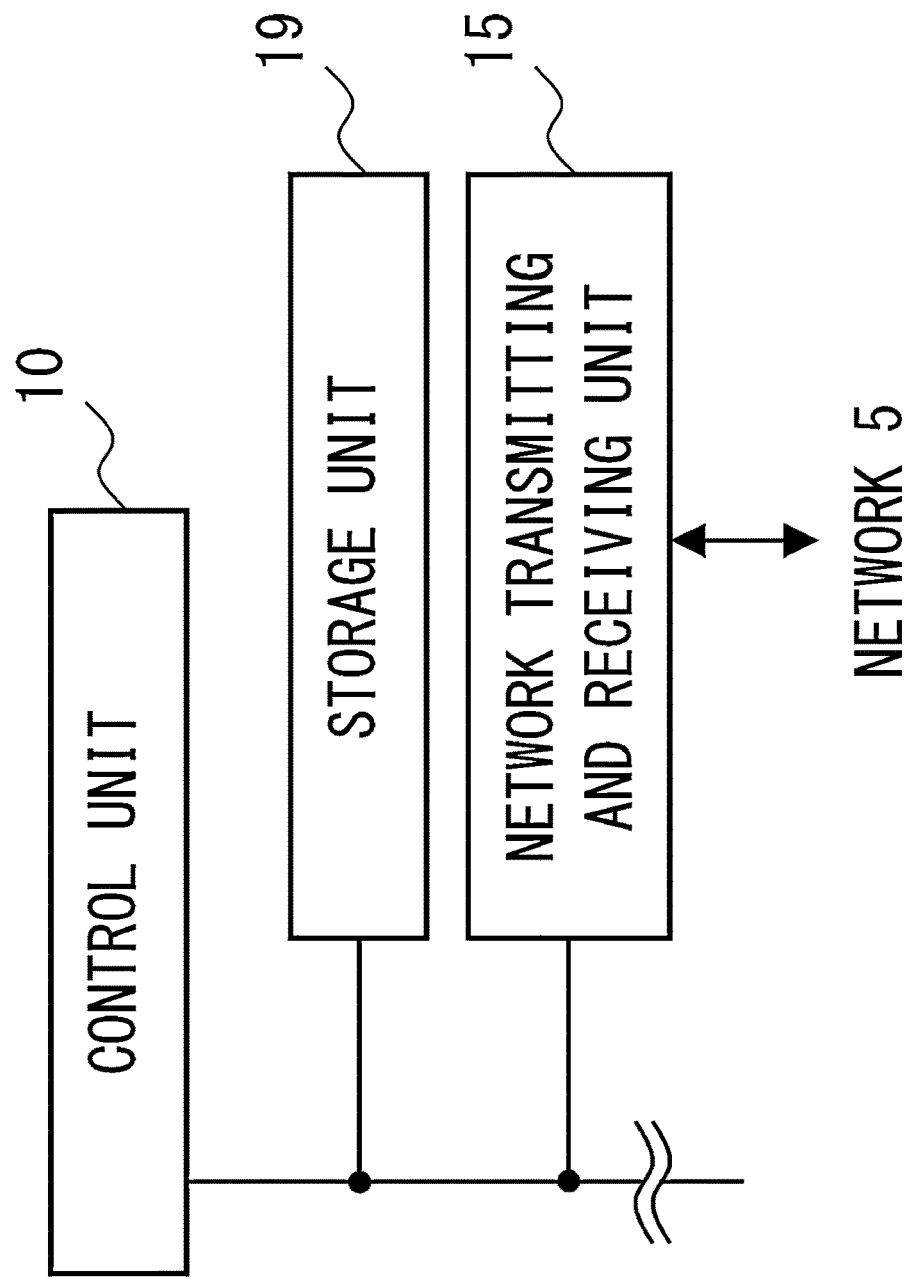
FIG. 2 is a block diagram showing the control configuration of the print server as shown in FIG. 1.

Next, with referring to FIG. 2, the control configuration of the print server 1 is described.

The print server 1 includes a control unit 10, a network transmitting and receiving unit 15, a storage unit 19, and the like. Each unit is connected to the control unit 10 and controlled in operation by the control unit 10.

The control unit 10 is an information processing unit such as GPP (General Purpose Processor), CPU (Central Processing Unit), MPU (Micro Processing Unit), DSP (Digital Signal Processor), GPU (Graphics Processing Unit), ASIC (Application Specific Integrated Circuit, an application-specific processor), or the like.

The control unit 10 reads the control program stored in the ROM or HDD of the storage unit 19, expands the control program in the RAM, and executes it, thereby operating as each unit of the function blocks as described later. Further, the control unit 10 controls the entire apparatus according to instruction information input from the administrator terminal or console.

The network transmitting and receiving unit 15 is a network connection unit including a LAN board, a wireless transmitting and receiving device, or the like, for connecting to the external network 5.

The network transmitting and receiving unit 15 transmits and receives data via a data communication line, and it transmits and receives voice signals via a voice telephone line.

The storage unit 19 is a non-transitory recording medium such as semiconductor memory including ROM (Read Only Memory) and RAM (Random Access Memory), HDD (Hard Disk Drive), or the like.

The control program for controlling the operation of the print server 1 is stored in the ROM or HDD of the storage unit 19. The control program includes an OS (Operating System), middleware on the OS, services (daemons), various applications, database data, and the like. Among these, the various applications include the printing process management application as described above. Furthermore, the storage unit 19 may also store account settings for the user of the industrial printing system X, other data, and the like.

In addition, in the print server 1, the control unit 10 is integrally formed, such as a CPU having built-in GPU, chip-on-module package, SOC (System On a Chip), or the like.

Also, the control unit 10 may have built-in RAM, ROM, flash memory, or the like.

[Functional Configuration of Print Server 1]

Here, with reference to FIG. 3, a functional configuration of the print server 1 is described.

The control unit 10 of the print server 1 includes a job changing unit 100 and a processing management unit 110.

The storage unit 19 stores resource information 200 and a job 210.

The job changing unit 100 changes the job 210 suitable to the other print server selected from the plurality of print servers based on the resource information 200 stored in the storage unit.

At this time, the job changing unit 100 can change the job 210 in units of paper catalog and paper group.

Furthermore, the job changing unit 100 can change the job 210 by using the calibration values of the resource information 200.

Additionally, the job changing unit 100 can modify the job 210 by using an imposition template.

At this time, if the paper size supported by the other print server is different from the paper size specified in the job 210, the job changing unit 100 can change the imposition template and perform re-imposition.

The processing management unit 110 transmits the job 210 changed by the job changing unit 100 to the other print server to request processing.

At this time, the processing management unit 110 may encrypt the job 210 and transmit it.

In addition, processing management unit 110 may share schedules based on trust relationships established with the other print server.

The resource information 200 is information summarizing various settings used in a step of printing process (printing step) by the printing apparatus 2 among the component apparatuses provided at the site managed by the print server 1.

The details of the resource information 200 are described later.

The job 210 is data in which various data used for production printing are collected. The job 210 may be described, for example, in JDF (Job Description Format) and/or JMF (Job Messaging Format). In the present embodiment, data mainly used in the printing step in the job 210 is described.

The job 210 includes job information, a job ticket, print data, print resource, and the like.

The job information is data including various attributes of print processing. The job information includes the type of the job 210, the name of the job 210, the name of the project (order), the number of copies to be printed, whether or not collation is required, whether or not there is a record, the cutting mm, the printing direction, the printing state, the priority, and the like. Among these, the type of job 210 may indicate a job 210 of a printing step (printing job) and a job 210 of a post-processing process (post-processing job). Also, the job information may include information about the printing apparatus 2 that performs distributed processing.

The job ticket is setting data for requesting the job 210. This request includes paper settings in workflow, which are order settings, such as paper size, paper weight, imposition position, and necessary settings for post-processing, or the like. In the present embodiment, the job ticket may be created from a workflow template for printing corresponding to the order. The job ticket may also be written in JDF and/or JMF.

The print data is data of a print manuscript in which a design is set according to the order. The print data may be, for example, electronic document data such as PDF (Portable Document Format), PS (Postscript) data, other vector data, manuscript submission format data, other raster image data, and the like.

The print resource is information on various resources necessary for printing instructions such as an ICC profile, and the like. The other resource data required for printing are also included in the print resource.

In addition, the job 210 may include processing change information. The processing change information is record information of changes during processing of the job 210. The processing change information may include, for example, information such as correction content when the job 210 is corrected for the other print server, changes in processing results in printing, and the like. The changes in the processing results include, for example, changes in the number of copies and pages, alternate profiles, correction of imposition positions, correction of milling designation, correction of cutting width, and the like.

Furthermore, the job 210 may include image data that has performed raster image processor (hereinafter abbreviated as "RIP") by offset printing based on the job ticket. The image data may be, for example, TIFF or other bitmap data. Additionally, the image data may be lossless or lossy compressed.

In addition to this, the storage unit 19 may store trust relationship data regarding established trust relationships to enable limited access with other management server, schedule information indicating the status of the schedule regarding the execution of each job 210, or the like.

Figure 5:
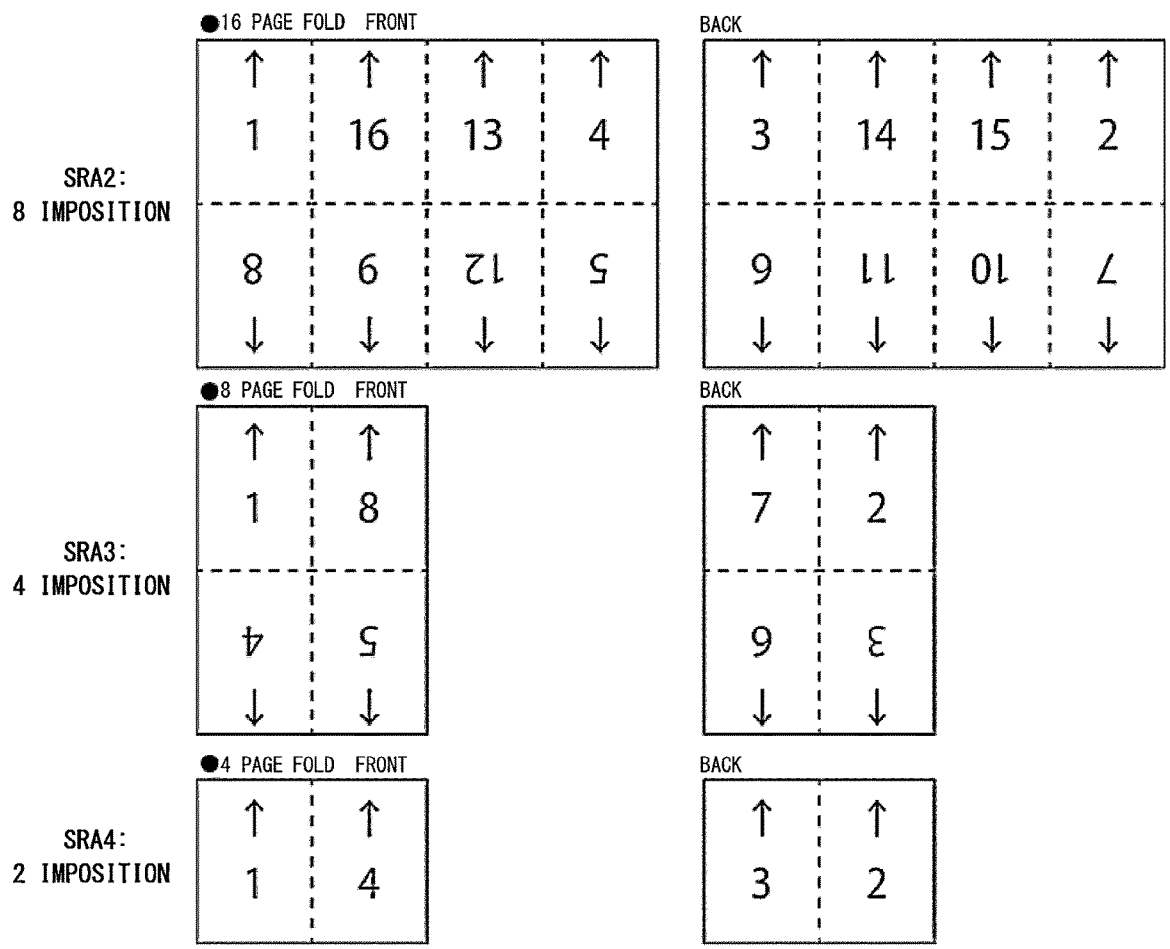
FIG. 5 is a conceptual diagram of the imposition settings as shown in FIG. 3.

Then, with reference to FIGS. 4 and 5, the details of the resource information 200 is described.

The resource information 200 includes paper settings 300 and imposition settings 310 for each print server 1.

Firstly, with reference to FIG. 4, paper setting 300 is described.

The paper setting 300 includes a paper catalog and paper group setting.

The paper catalog is data that summarizes paper attributes. For example, a user of the print server 1 can designate various paper attributes and register a paper catalog with a unique name, or the like. As a result, when printing the job 210, the paper can be selected by designating the paper catalog name without designating each paper attribute.

As the paper attributes, paper size, paper type (plain paper, coated paper, . . . ), paper color, coat type, texture, weight, or the like, can be specified.

In addition to this, the paper catalog also contains a calibration value for each printing apparatus 2 as the attribute.

In the present embodiment, it is possible to use the same calibration value for paper having the same paper attributes other than paper size and weight. Therefore, the calibration value can be treated as an attribute of the paper catalog.

Specifically, since the calibration value differs for each printing apparatus 2, the calibration value for each printing apparatus 2 is kept in the paper catalog.

For example, for the "Pre-cut: White" paper catalog as shown in FIG. 4, in the present embodiment, it is possible to set a calibration value for the printing apparatus 2a, a calibration value for the printing apparatus 2b, and a calibration value for the printing apparatus 2c, respectively.

The paper group is data obtained by grouping a plurality of the paper catalogs.

By managing the paper catalog as a group, the paper group can manage a large number of types of paper without complication.

In the example of FIG. 4, the paper catalogs "Pre-cut: White" and "Plan: Goldenred" are defined, and the paper group "Mondi NAUTILUS Triotec ReFresh" containing them is also defined. That is, the paper group can be hierarchically defined.

Then, with reference to FIG. 5, the imposition setting 310 is described.

The imposition setting 310 sets an imposition template in which finishing and imposition for each paper size are set. That is, the imposition is set based on the template because it differs depending on the finish and paper size. This template can be shared among print servers 1 by resource information 200.

In the example of FIG. 5, about the imposition setting 310, templates for imposition of paper sizes of "SRA4", "SRA3", and "SRA2" in which the finish is A5 size with perfect binding. In this example, a template for a two imposition is set for "SRA4", a template for a four imposition is set for "SRA3", and a template for an eight imposition is set for "SRA2".

Here, the control unit 10 of the print server 1 is caused to function as the job changing unit 100 and the processing management unit 110 by executing the control program stored in the storage unit 19.

Also, each unit of the print server 1 as described above is a hardware resource that executes the output management method according to the present disclosure.

In addition, a part or any combination of the functional configurations as described above may be configured in terms of hardware or circuits by using an IC, programmable logic, FPGA (Field-Programmable Gate Array), or the like.

[Job Distribution Execution Process by Print Server 1]

Figure 6:
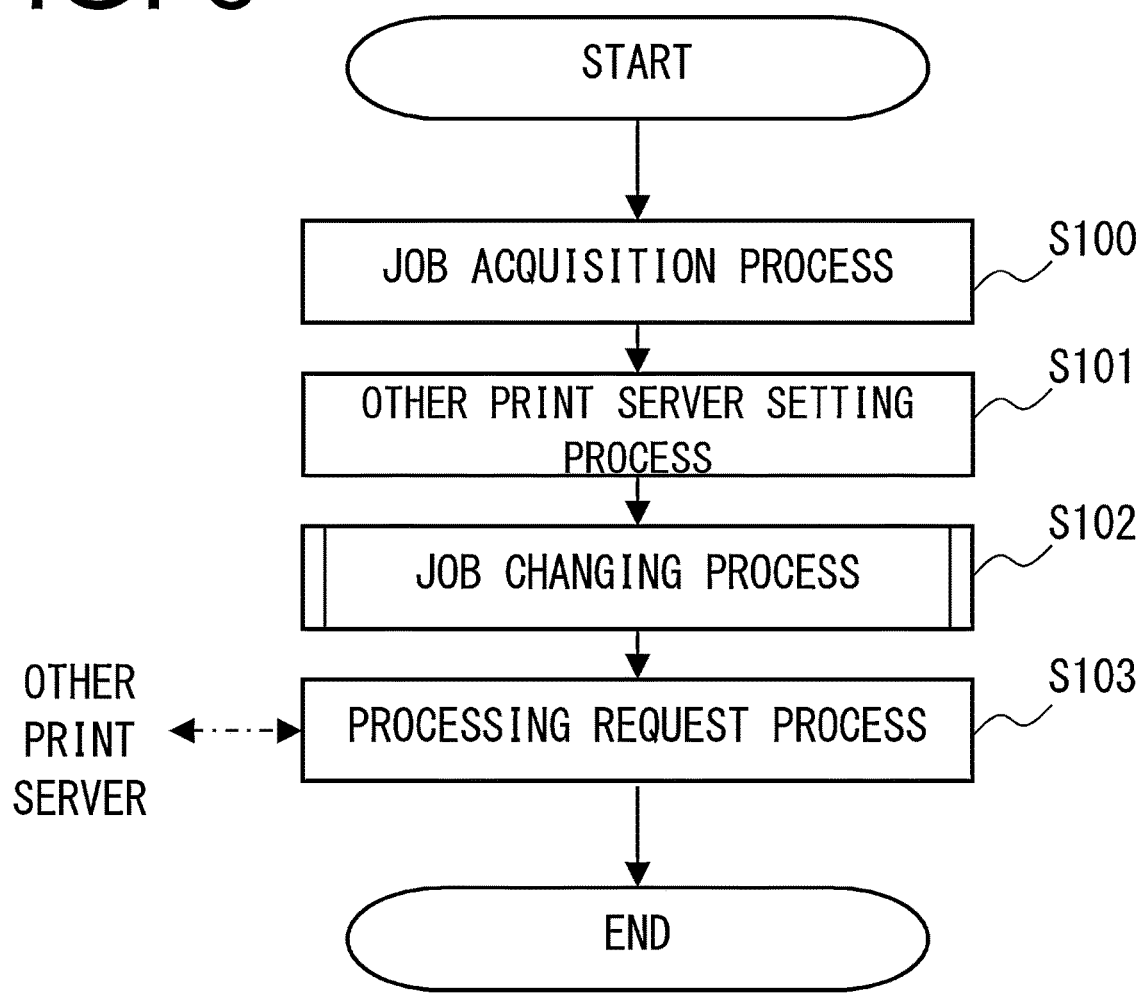
FIG. 6 is a flowchart of job distribution execution process according to the embodiment of the present disclosure.
Figure 7:
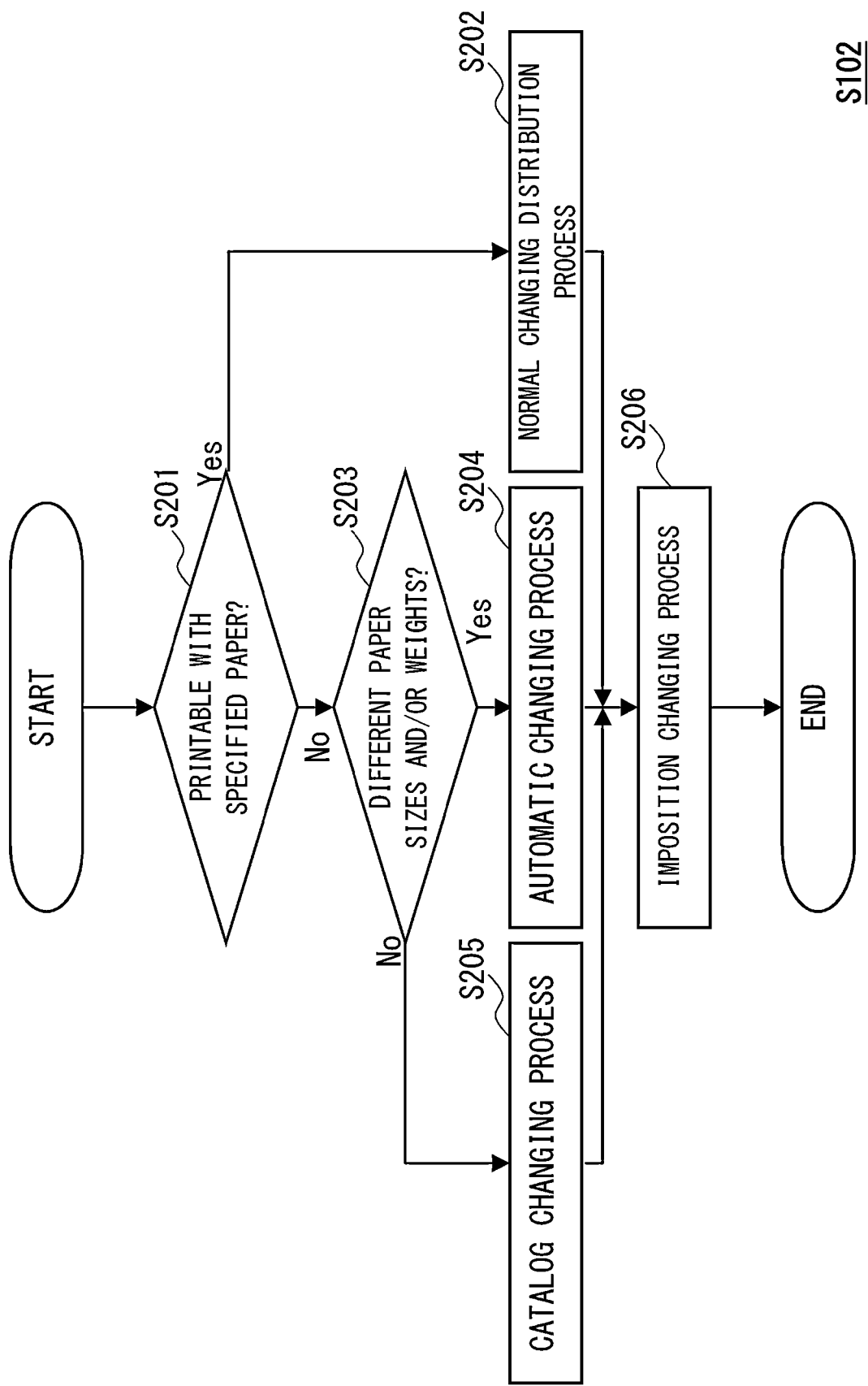
FIG. 7 is a flowchart showing details of the job change processing as shown in FIG. 6.

Next, with reference to FIGS. 6 and 7, a job distribution execution process by the print server 1 according to the embodiment of the present disclosure is described.

In the job distributed execution process according to the present embodiment, based on the stored resource information 200 related to paper setting 300 and imposition setting 310 of the plurality of print servers 1, the other print server capable of processing the job 210 is determined from the plurality of print servers 1. At this time, based on the resource information 200, the job 210 is changed so as to suitable to the other print server selected from the plurality of print servers 1. Then, the changed job 210 is sent to the other print server to request processing.

In the job distribution execution process according to the present embodiment, as a representative example, the print server 1a of the printing company A (site) is set as the originating print server (processing request side), and an example in which the control unit 10 of the print server 1a mainly executes a program stored in the storage unit 19 in cooperation with each unit and by using hardware resources is described.

With reference to a flowchart of FIG. 6, the details of the job distribution execution process are described step by step as follows.

(Step S100)

Firstly, the job changing unit 100 performs a job acquisition process.

The job changing unit 100 acquires the job 210 to be subjected to peer-to-peer distributed processing from an administrator terminal, a prepress apparatus, or the like. The job 210 may cause the administrator terminal to execute the web browser or a dedicated application for the print document submitted by the submission terminal. At this time, the job ticket including print processing settings for each page may be generated by using a GUI (Graphical User Interface), or the like, on the screen of the dedicated application.

In the present embodiment, an example is explained that the print server 1a is the originating print server from which this job 210 is obtained. In addition, in each job 210, any one or any a combination of the plurality of the component apparatuses may be selected and used in the printing step and the post-processing step.

(Step S101)

Then, the job changing unit 100 performs an other print server setting process.

Based on the information in the resource information 200, the schedule information of the processing of each print server 1, or the like, the job changing unit 100 selects the other print server provided in a cooperative site to be a request destination of distributed processing (hereinafter abbreviated as "distribution destination"). In the present embodiment, the print server 1b and the print server 1c are the other print servers.

After that, the job changing unit 100 reads out the capability information of the printing apparatus 2 at the distribution destination. This capability information may be acquired from the print server 1 at the distribution destination and stored in the storage unit 19 of the originating print server.

Here, the job changing unit 100 determines processing requirement, which is the requirement that requires processing in the printing step, by using job information, the job ticket, print data, print resource, and the like, included in the job 210.

After that, based on the resource information 200 and the processing requirement, the job changing unit 100 determines whether the job 210 can be processed as is by the printing apparatuses 2 at the distribution destination or not.

Further, the job changing unit 100 may determine that a plurality of the other print servers can be processed.

(Step S102)

Then, the job changing unit 100 performs job changing process.

Based on the resource information 200, the job changing unit 100 changes the job 210 so that it is suitable to the other print server selected from the plurality of print servers 1.

The details of the job change processing is described later.

(Step S103)

Then, the processing management unit 110 performs a processing request process.

The processing management unit 110 transmits the job 210 to the other print server as the distribution destination to request processing. This job 210 may be changed by the job changing unit 100. As a result, the processing management unit 110 can distribute the job 210 and process it at the other site.

At this time, the processing management unit 110 may request the processing according to the processing schedule of the other print server.

Further, the processing management unit 110 can encrypt the job 210 and transmit it to the other print server.

When the other print server receives the job 210, it instructs the selected component apparatus to perform processing the job 210. For example, the other print server causes printing apparatus 2 to print, or the like. As a result, the printing apparatus 2 can output for printing based on the job 210.

The other print servers may send the results of this processing to the originating print server. In this case, the processing management unit 110 of the originating print server can also record the result of the process of the job 210 in the process change information of the job 210.

With the above, the job distribution execution process according to the embodiment of the present disclosure completes.

[Details of Job Changing Process]

Next, with reference to the flowchart in FIG. 7, details of the job changing process as shown in FIG. 6 is described step by step.

(Step S201)

Firstly, the job changing unit 100 determines whether or not it is printable with the specified paper.

The job changing unit 100 refers to the processing requirements of the job 210 and determines Yes if the printing apparatus 2 of the distribution destination can print (supporting) with the paper specified in the job 210. Otherwise, the job changing unit 100 determines No if printing cannot be performed as it is.

In the case of Yes, the job changing unit 100 advances the process to step S202.

In the case of No, the job changing unit 100 advances the process to step S203.

(Step S202)

If it can be printed with the specified paper, the job changing unit 100 performs a normal changing distribution process.

The job changing unit 100 sets a paper catalog that matches the paper settings 300 specified in the job 210. In addition, the job changing unit 100 sets the job 210 to use the calibration value for the printing apparatus 2 at the distribution destination.

After that, job changing unit 100 advances the process to step S206.

(Step S203)

If it cannot be printed with the specified paper, the job changing unit 100 determines whether the paper size and/or weight of the distribution destinations are different or not.

If the paper size and/or weight supported by the distribution destination printing apparatus 2 is different from the paper setting specified in the job 210, the job changing unit 100 determines Yes.

Otherwise, that is, if the paper attribute other than the paper size and weight supported in printing apparatus 2 at the distribution destination is different from the paper settings specified in the job 210, the job changing unit 100 determines No.

In the case of Yes, the job changing unit 100 advances the process to step S204.

If No, the job changing unit 100 advances the process to step S205.

(Step S204)

If the paper sizes and/or weights are different, the job changing unit 100 performs an automatic changing process.

When the distribution destination printing apparatus 2 does not support the paper specified in the job 210, the job changing unit 100 changes the paper settings 300 of the job 210 according to the supported paper in the printing apparatus 2 at the distribution destination.

Specifically, the job changing unit 100 sets the paper catalog that matches the other paper settings 300 of the resource information 200. Then, the calibration values for the printing apparatus 2 of the distribution destination are used.

After that, job changing unit 100 advances the process to step S206.

(Step S205)

If the paper attribute other than the paper size and weight of the distribution destinations is different, the job changing unit 100 performs a catalog changing process.

In this case, the job changing unit 100 allows the user to select an appropriate paper catalog from the paper group.

Specifically, the job changing unit 100 presents paper catalogs with a high matching degree of paper attributes as selection candidates on the GUI of the dedicated application screen, or the like, and it allows the user to select an appropriate paper catalog.

At this time, the job changing unit 100 may be able to present selection candidates by designating a priority order of the degree of matching for each attribute. For example, the job changing unit 100 can present papers with a high degree of matching in the order of paper type, paper color, coat type, and texture as selection candidates.

Furthermore, the job changing unit 100 can change the number of print pages of the print document, the color profile to be used, and the like.

(Step S206)

Here, the job changing unit 100 performs an imposition changing process.

The job changing unit 100 may change the imposition setting 310 to an imposition template corresponding to the paper size supported by the printing apparatus 2 at the distribution destination, thereby performing re-imposition.

At this time, in the case of a print document before imposition processing, the job changing unit 100 can also set an imposition template according to the supported paper sizes of the printing apparatuses 2 at the distribution destinations.

On the other hand, in the case of a print document that has already been imposition processing, the job changing unit 100 extracts the originally included print document from the PDF, or the like, in the print document that has already been performed the imposition. That is, the job changing unit 100 may acquire image data, which is rasterized (Raster Image Processor) as image data such as TIFF, or the like, in the page units. In addition, the job changing unit 100 can perform re-imposition by using an imposition template corresponding to the supported paper size of the printing apparatus 2 at the distribution destination.

With the above, the job changing process completes.

By configuring as described above, the following effects can be obtained.

In typical production printing, there is a case where a plurality of printing apparatuses distributes and process printing in order to process a large amount of printing in a short period of time. Such distributed processing requires a management server that transmits and manages print data to a plurality of printing apparatuses. In other words, with the typical technology, it was necessary to build a system centered on the management server.

Furthermore, when the plurality of distributed printing apparatuses cannot be unified with the same model, or when the post-processing apparatuses are different, the job cannot be processed printing as it is at the distribution destination in most cases.

On the other hand, the industrial printing system X according to the present embodiment is an industrial printing system for production printing having a plurality of print servers 1 for distributed processing of a job 210, and each of the plurality of print servers 1 including: a storage unit 19 that stores resource information 200 related to paper setting 300 and imposition setting 310 of the plurality of print servers 1; a job changing unit 100 that changes the job 210 suitable to other print server selected from the plurality of print servers 1 based on the resource information 200 stored in the storage unit 19; and a processing management unit 110 that transmits the job 210 changed by the job changing unit 100 to the other print server and requests processing.

By configuring in this way and sharing the resource information 200 regarding the paper settings 300 and the imposition settings 310 between the print servers 1, a peer-to-peer output management system capable of flexibly distributed processing can be provided. That is, in the industrial printing system X according to the present embodiment, there is no need to separately prepare a special management server for distributed processing.

In addition, even if the models and processing capabilities of the printing apparatuses 2 and post-processing apparatuses 3 at the distribution destination are different, the jobs 210 can be distributed and processed in a distributed manner. That is, the distributed processing as cooperation between printing companies can be performed instead of just distributed processing that simply distributes the jobs 210 to a plurality of printers within a printing factory.

Specifically, The same printing apparatuses 2 or post-processing apparatuses 3 may not be used between printing companies.

On the other hand, the industrial printing system X according to the present embodiment enables distributed processing even between different printing apparatuses 2 or post-processing apparatuses 3. As a result, a distributed processing system can be constructed more easily, and the collaboration between sites can be conducted.

In the industrial printing system X according to the present embodiment, the paper setting 300 of the resource information 200 include settings of a paper catalog that summarizes paper attribute and a paper group that groups the paper catalogs; and the job changing unit 100 changes the job 210 in units of the paper catalog and the paper group.

With this configuration, the job 210 can be changed according to the paper catalog and the paper group set in the resource information 200, and distributed processing can be performed by the other print server. As a result, printing can be performed even if the printing apparatus 2 at the distribution destination does not have a paper designated in the job 210.

In the industrial printing system X according to the present embodiment, the paper catalog includes a calibration value for each printing apparatus 1; and the job changing unit 100 changes the job 210 by using the calibration value.

By configuring in this way, when requesting distributed processing of the job 210 to the other print server, the print finish can be similar. Therefore, differences due to differences in characteristics can be suppressed between sites provided with the same printing apparatus 2. Also, cooperation among multiple sites is facilitated even between sites having different printing apparatuses 2.

In the industrial printing system X according to the present embodiment, the imposition setting 310 of the resource information 200 is set with an imposition template in which the imposition for each finish and paper size is set; and the job changing unit 100 uses the imposition template to modify the job 210.

By configuring in this way, imposition for each paper size can be clarified and change can be facilitated. This facilitates collaboration between sites that support different types of paper.

In the industrial printing system X according to the present embodiment, the job changing unit 100 changes the imposition template and performs re-imposition when the paper size supported by the other print server is different from the paper size specified in the job 210.

By configuring in this way, even if the paper sizes used at the distribution destinations are different, the imposition can be changed and distributed processing can be performed. As a result, the time and effort of manual adjustment can be reduced, the processing of the job 210 can be made efficient, and the running cost can be reduced.

Other Embodiments

In the above-described embodiment, an example is described in which the resource information 200 of a plurality of print servers 1 is stored in the originating print server or obtained from the other print server.

However, a configuration is also possible in which the originating print server determines whether the job 210 can be processed or not based on the processing requirement of the job 210, and it transmits the processing requirements of the job 210 to the other print server. In this case, the other print server may determine whether the job 210 is processable or not based on the processing requirement of the job 210 and the resource information 200 stored in its own storage unit 19.

By configuring in this manner, it is possible to determine whether the job 210 can be processed or not without acquiring the resource information 200 of the other print server, thereby it saves the trouble of updating the resource information 200, and the like.

Further, in the above-described embodiment, the job ticket of the job 210 is described so as to include information on the paper size, paper weight, and imposition position.

However, such information may be included in any of the job information, print data, and print resources in the job 210. Even in these cases, the job changing unit 100 can determine the processing requirement of the job 210.

Also, in the above-described embodiment, an example in which the job 210 is mainly a printing job has been described.

However, it is also possible to perform similar distributed processing even for a post-processing job. In such case, different print servers 1 (groups) may be used to determine in the printing step and the post-processing step.

Further, one of the other print servers may be allowed to perform distributed processing of both the job 210, which is the printing job, and the other job 210, which is the post-processing job.

In addition, priority may be given as to which print server 1 is the other print server. This priority may be set based on the availability measure of schedule information, the number and performance of component apparatuses, cost, and other information.

By configuring in this way, the job 210 can be performed distributed processing to each site more efficiently.

Further, in the above-described embodiment, an example of requesting the other print server to process by changing the paper size, catalog, or the like of the job 210 has been described.

In addition to this, it is also possible to change the job 210 according to the result, the change, or the like, by processing the job 210. Specifically, when the job 210 is changed, the post-processing job 210 can also be changed according to this change.

Also, the job 210 itself can be divided and send the divided job 210 to the originating print server or a print server other than the requested print server.

With such configuration, the job 210 can be executed by distributed processing even if trouble occurs or there is a limit for processing capacity.

Further, in the above-described embodiment, how the job 210 requested processing to the other print server is managed after processing is not described.

However, the job 210 requested processing to the other print server and has been processed may be deleted from the storage unit 19 in the other print server and the originating print server.

Alternatively, the processed job 210 may be sent again to the originating print server. Also, after the printing process is completed, the job 210 may be directly sent to the print server, which is different from the processing one, to be processed in the post-processing process.

By configuring in this way, the processing of the job 210 can be made more efficient.

Further, as described above, when the processing request is adjusted, the change information may be recorded in the job 210 itself, and the changed job 210 may be acquired at the originating print server. Furthermore, the job 210 can also include image data performed RIP by the other print server.

As a result, even if retransmitting the job 210 to a print server 1 other than the requested one, the same output, or the like, can be performed.

Also, in the above-described embodiment, as the production printing, an example of printing paper as an order is described. However, the present disclosure is also applicable to production printing other than this.

For example, it can also be used for division printing of large-sized posters, sheet printing of exterior and interior of aircraft or automobiles, manufacture of electronic parts such as flat displays and electronic substrates, printing of cultured cells, or the like. In such case, industrial inkjet printers, industrial robots, various reaction apparatuses, culture apparatuses, or the like, can be used as component apparatuses.

By configuring in this way, it becomes possible to correspond to various uses.

Further, the configuration and operation of the above-described embodiment are examples, and needless to say, they can be modified and executed as appropriate without departing from the scope of the present disclosure.

What is claimed is:

1. An industrial printing system for production printing having a plurality of print servers for distributed processing of a job, and each of the plurality of print servers comprising:
   a storage unit that stores resource information related to paper setting and imposition setting of the plurality of print servers;
   a job changing unit configured to change the job suitable to other print server selected from the plurality of print servers based on the resource information stored in the storage unit; and
   a processing management unit configured to transmit the job changed by the job changing unit to the other print server to request processing.

2. The industrial printing system according to claim 1, wherein:
   the paper setting includes paper catalog that summarize paper attribute and a paper group setting that groups the paper catalog; and
   the job changing unit changes the job in units of the paper catalog and the paper group.

3. The industrial printing system according to claim 2, wherein:
   the paper catalog includes a calibration value for each printing apparatus; and
   the job changing unit changes the job by using the calibration value.

4. The industrial printing system according to claim 1, wherein:
   the imposition setting is set an imposition template having imposition setting for each finish and paper size; and
   the job changing unit uses the imposition template to modify the job.

5. The industrial printing system according to claim 4, wherein:
   the job changing unit changes the imposition template and performs re-imposition when the paper size supported by the other print server is different from the paper size specified in the job.

6. A print server that performs distributed processing of jobs in an industrial printing system for production printing, comprising:
   a storage unit that stores resource information related to paper setting and imposition setting of the plurality of print servers;
   a job changing unit configured to change the job suitable to other print server selected from the plurality of print servers based on the resource information stored in the storage unit; and
   a processing management unit configured to transmit the job changed by the job changing unit to the other print server to request processing.

7. The print server according to claim 6, wherein:
   the paper setting includes paper catalog that summarize paper attribute and a paper group setting that groups the paper catalog; and
   the job changing unit changes the job in units of the paper catalog and the paper group.

8. The print server according to claim 7, wherein:
   the paper catalog includes a calibration value for each printing apparatus; and
   the job changing unit changes the job by using the calibration value.

9. The print server according to claim 6, wherein:
   the imposition setting is set an imposition template having imposition setting for each finish and paper size; and
   the job changing unit uses the imposition template to modify the job.

10. The print server according to claim 9, wherein:
    the job changing unit changes the imposition template and performs re-imposition when the paper size supported by the other print server is different from the paper size specified in the job.

11. A process management method performed by an industrial printing system for production printing having a plurality of print servers for distributed processing of jobs, comprising the steps of:
    storing resource information related to paper setting and imposition setting of the plurality of print servers;
    changing the job suitable to other print server selected from the plurality of print servers based on the resource information that is stored; and transmitting the job that is changed to the other print server to request processing.

12. The process management method according to claim 11, wherein:
the paper setting includes paper catalog that summarize paper attribute and a paper group setting that groups the paper catalog; and
changing the job in units of the paper catalog and the paper group.

13. The process management method according to claim 12, wherein:
the paper catalog includes a calibration value for each printing apparatus; and
changing the job by using the calibration value.

14. The process management method according to claim 11, wherein:
the imposition setting is set an imposition template having imposition setting for each finish and paper size; and
using the imposition template to modify the job.

15. The process management method according to claim 14, wherein:
changing the imposition template and performs re-imposition when the paper size supported by the other print server is different from the paper size specified in the job.

* * * * *